Oct. 22, 1946.  J. B. LITTLE  2,409,636
WELDING MACHINE
Filed Oct. 20, 1944  2 Sheets-Sheet 1

INVENTOR
J. B. LITTLE
BY J. MacDonald
ATTORNEY

Oct. 22, 1946. J. B. LITTLE 2,409,636
WELDING MACHINE
Filed Oct. 20, 1944 2 Sheets-Sheet 2
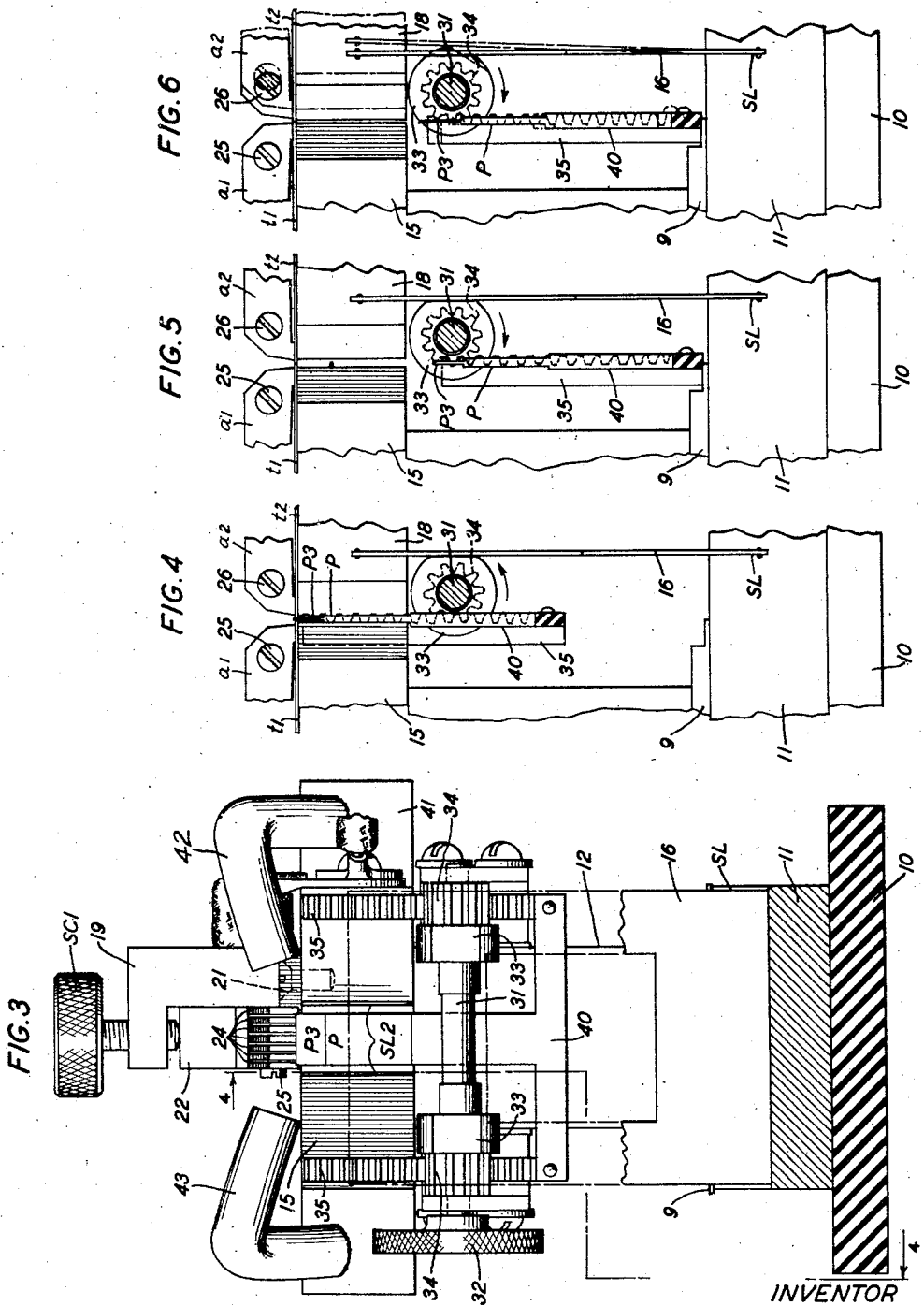
INVENTOR
J. B. LITTLE
BY J. MacDonald
ATTORNEY Patented Oct. 22, 1946

2,409,636

UNITED STATES PATENT OFFICE 2,409,636

WELDING MACHINE

John B. Little, Summit, N. J., assignor to Bell Telephone Laboratories, Incorporated, New York, N. Y., a corporation of New York Application October 20, 1944, Serial No. 559,597

4 Claims. (Cl. 219—4)

This invention relates to welding devices.

Heretofore, the ends of tapes as used in electromagnetic recording and reproducing machines, for example, were united by placing the ends of the tape in superposed or overlapping relation to each other and spot welded. This type of weld, however, while being satisfactory from a physical standpoint, does not lend itself to machining or grinding to the thickness of the body of the tape with the result that this increased thickness at the weld and the consequent large gap required between the poles of the recording electromagnets greatly impair the recording and reproducing of the record.

The object of this invention is the provision of a welding device which will be simple in construction, convenient in use and in which the ends of a tape constructed of magnetic material are welded in a manner which permits machining, filing or grinding the oversized portion of the tape at the weld to a dimension corresponding to the cross-sectional area of the body of the tape, thus permitting the adjustment of the recording electromagnets at a minimum spaced distance from the surface of the tape.

According to the welding device of this invention a base consisting of a plate of insulating material serves for mounting a second plate of metallic material to which an insulated metallic supporting means for a stationary electrode is secured, the stationary electrode having means for securing one end of the tape on that electrode while springs extending perpendicularly from the metallic plate serve as supporting means for an oblong-shaped electrode disposed in a common plane and in coaxial relation to the stationary electrode, the second electrode being movable toward and away from the stationary electrode under control of manually operable means in the form of a shaft having actuating means disposed in engageable relation with one pair of the movable electrode supporting springs.

A clamping device carried by the movable electrode serves for securing the opposite end of the tape in coaxial relation to the other end of the tape on the stationary electrode, while the operation of the manually operable shaft in one direction is effective to actuate means in the form of a spacer member in position to assist in locating the ends of the tape in their securing clamping means and determining the movement of the movable electrode relative to the stationary electrode for engaging the ends of the tape in abutting relation to each other, the movement of the movable electrode being effected under the medium of the tension of the springs supporting this electrode following the retracting movement of the spacer means to normal position by the operation of the manually movable shaft in the reverse direction. A system of tubing is provided for blowing helium gas onto the ends of the tape while effecting the welding operation so as to prevent oxidation of the material at its heated portions to assure the uniting of the two ends of the tape by a weld which is substantially equal in strength to that of the body of the tape thus welded.

Other novel features and advantages of the invention will appear from the following description and by the claims appended thereto, reference being had to the accompanying drawings in which:

Fig. 3 is a vertical sectional view taken on line 3—3 of Fig. 1, enlarged, shown with the spacer member in operated position;

Fig. 4 is a partial view shown with a number of operating parts in vertical section taken on line 4—4 of Fig. 3, showing the ends of the tape secured in adjusted spaced relation to each other and to the electrodes as defined by the spacer member;

Figure 1:
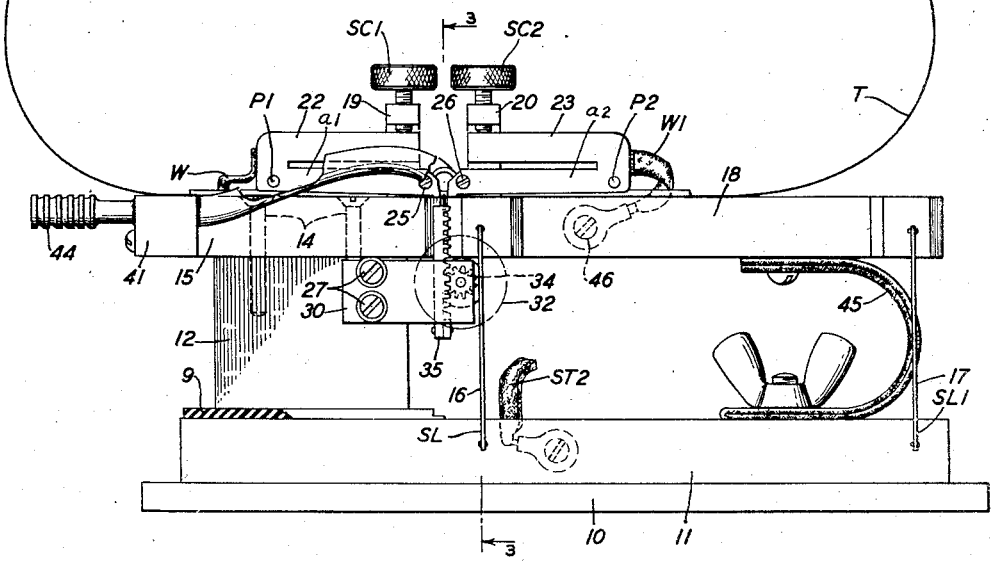
Fig. 1 is a side elevation shown with a number of operating parts with portions cut away and with the ends of the tape to be welded clamped in adjusted position on their respective electrodes.

Fig. 5 is a view showing the cam shaft rotated one complete turn from the position shown in Fig. 4 and the spacer member in retracted position; and Fig. 6 is a view similar to that of Figs. 4 and 5 showing the cam on the manually operable shaft holding the movable electrode away from the stationary electrode, the ends of the tape being freed between the electrodes and clamping means mounted on their electrodes.

According to the construction of the welding device of this invention a rectangularly-shaped base 10 of insulating material serves for mounting a similarly shaped plate 11 of metallic material to which is secured a block 12 serving for securing, as by a number of screws 14, an electrode 15, the block 12 being insulated from the plate 11 by a sheet 9 of mica or similar insulating material.

The metallic plate 11, as shown in Fig. 1, is provided with transversely disposed slots SL and SL1 into which are fitted the lower disposed ends of two U-shaped springs 16 and 17 extending perpendicularly from the plate 11 and having their free ends fitted in slots in a second electrode 18 disposed in a common plane and in coaxial relation to the stationary electrode 15 as shown.

Figure 2:
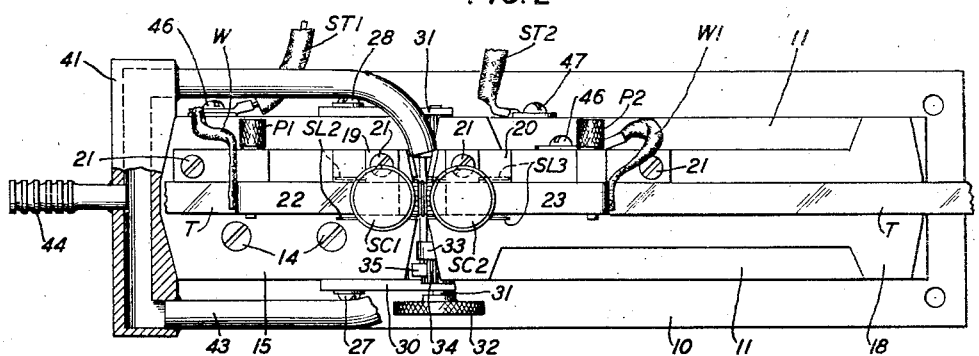
Fig. 2 is a top view of Fig. 1.

On the electrodes 15 and 18 are secured, as by a number of similar screws 21 best seen in Fig. 2, brackets 19 and 20, these brackets having pivots P1 and P2 serving for mounting the clamps 22 and 23 serving for securing the ends t1 and t2 of the tape T onto the electrodes 15 and 18, the brackets 19 and 20 in addition serving for readily positioning the ends of the tape in longitudinal alignment to each other between the clamps and the electrodes 15 and 18.

Each clamp 22 and 23, as shown in Fig. 1, is slotted longitudinally so as to provide resiliency between the two arms thus formed in each clamp when their lower disposed arms are pressed onto the ends t1 and t2 of the tape T as effected by the tightening of thumb screws SC1 and SC2 of brackets 19 and 20.

The lower disposed arms a1 and a2 of clamps 22 and 23, as shown in Fig. 3, are slotted vertically to form a series of vertically disposed prongs 24 so as to obtain a more uniform pressure contact and flow of current toward the abutting ends of the tape while screws 25 and 26 hold the prongs 24 thus formed against sidewise bending upon the tightening of the thumb screws SC1 and SC2 as for securing the ends t1 and t2 of the tape T between their respective clamps and electrodes, these electrodes in turn having vertically disposed slots SL2 and SL3 best seen in Figs. 2 and 3 provided to direct the flow of current toward the abutting ends of the tape.

On the block 12 which supports the stationary electrode 15, best seen in Figs. 1, 2 and 3, are secured, as by a number of screws 27 and 28, the arms 30 and 31 serving for supporting a shaft 31' rotated by a manually operable knob 32 and on this shaft are keyed a pair of similarly shaped cams 33 and a pair of pinions 34, the latter engaging with vertically disposed gear racks 35 secured at their lower ends to an inverted T-shaped member 40 of insulating material, the vertically disposed portion of which is formed with different thicknesses P and P3 to serve as spacers for the electrodes 15 and 18 and the ends t1 and t2 of the tape.

The rotation of cams 33 in the direction indicated by the arrow in Fig. 6 is effective to engage the spring arms 16 for moving them and the electrode 18 away from the stationary electrode 15 as shown in dotted lines, while a complete turn of shaft 31 through the gears 34 simultaneously moves the spacer member 40 to the position shown in Figs. 3 and 4 where the cams 33 release the spring arms 16 to cause the operation of the movable electrode 18 in position for engaging the spacer portion P, of the spacer preparatory to the placing of the ends t1 and t2 of the tape in abutting relation against the portion P2 of this spacer member when they are secured onto their respective electrodes by the tightening of thumb screws SC1 and SC2 which is followed by the rotation of shaft 31 and the cams 33 keyed thereon in a reverse direction as indicated by the arrow shown in Fig. 4 for moving the electrode 18 away from the stationary electrode and simultaneously moving the spacer member downwardly to the position shown in Fig. 5 where the cams 33 again permit the operation of the movable electrode for engaging the ends t1 and t2 of the tape in abutting relation to each other preparatory to the welding operation.

Onto the stationary electrode 15 is secured a head piece 41 fitted with tubings 42 and 43 extending from this head piece in juxtaposition to the abutting ends of the tape, while a tubing 44 serves to connect a source of helium gas directed onto the ends of the tape during the welding operation so as to prevent oxidation of the material.

Electrical connection to the clamping devices 22 and 23 and the electrodes 15 and 18 is effected by the conducting wires W and W1. The wire W connects with the incoming conducting strip ST1 by a screw 46 engaging a similarly threaded hole in the electrode 15, while an incoming wire ST2 connects with the metallic plate 11. The opposite ends of conducting strips W and W1 are secured as by welding to their respective clamping devices 22 and 23 as best seen in Fig. 2 while the electrode 18, as shown in Fig. 1, is electrically connected to the metallic plate 11 by a conducting strip 45 in addition to the U-shaped springs 16 and 17.

In a typical example of a welding operation, with the cam shaft 31 and, therefore, the movable electrode 18 away from the stationary electrode 15, as shown in dotted lines in Fig. 6, the spacer member is moved between these electrodes to the position indicated in Fig. 4 where the cams 33 release the movable electrode to permit the latter to move by the tension of springs 16 and 17 against the portion P of spacer element 40 as shown in Fig. 4. The ends t1 and t2 of the tape are then placed on the electrodes 15 and 18 in abutting relation against the portion P3 of the spacer member 40 and the thumb screws SC1 and SC2 tightened for securing the ends of the tape onto their respective electrodes which is followed by the rotation of cam shaft 31 in the direction indicated by the arrow in Fig. 4 for moving the movable electrode away from the spacer member and simultaneously moving the latter downwardly to the position shown in Fig. 5 where the cams 33 release the movable electrode 18 which is then moved by the tension of the supporting springs 16 and 17 for engaging the two ends of the tape in abutting relation to each other. The welding operation is effected by the switching of an electric current to the electrodes and thereby heating the ends of the tape at that resistance point while simultaneously blowing helium gas on the heated portion of the tape so as to prevent oxidation of the material, the loosening of the thumb screws SC1 and SC2 of the clamps permitting the removal of the tape thus welded while preparing the device for a succeeding welding operation.

What is claimed is:

1. In a device for welding the ends of a metallic tape in coaxial abutting relation to each other, said device comprising a base, an electrode secured to said base, a movable electrode, spring means for supporting said movable electrode in spaced relation to said base and in a common plane relative to said stationary electrode, means for adjustably positioning the ends of the tape relative to the adjacent end portions of said electrodes in welding position thereon, and means for securing the ends of the tape on said electrodes in said adjusted welding position, the tension of said supporting spring means serving to impart movement to said movable electrode for urging the ends of the tape against each other an amount corresponding to the thickness of the means positioning the ends of the tape for effecting the weld.

2. In a device for welding metallic tape, said device comprising a base, an electrode having a flat surface for supporting one end of the tape, means carried by said base for mounting said electrode, another electrode having a flat surface for supporting the other end of the tape, spring means for mounting the last-mentioned electrode on said base with its flat surface in a plane common to the flat surface of the first-mentioned electrode, brackets mounted on the adjacently disposed ends of said electrodes, a clamping element mounted on each of said brackets, means carried by said brackets for engaging said clamping elements for securing the ends of the tape onto the flat surface of each of said electrodes, said brackets forming guiding means for positioning the ends of the tape in coaxial relation to each other on the flat surface of each of said electrodes prior to the operation of said securing means, a spacer member, a mechanism for moving said spacer member in position for controlling the movement of said electrodes toward each other under the tension of said electrode supporting means for engaging the ends of the tape during the welding operation, and electrical conductors connecting said electrodes and said clamping elements.

3. In a device for welding the ends of a metallic tape of the type used in electromagnetic recording and reproducing machines, said device comprising two electrodes, a pair of resilient supports for one of said electrodes, a cam shaft engaging one of said resilient supports for imparting movement to the last-mentioned electrode for tensioning both of said supports, a pair of gears on said cam shaft, a rack meshing with each of said gears, a member of insulating material carried by said racks having spacer portions, one of said portions serving as means for defining the spaced relation of said electrodes and the other for determining the spaced relation between the ends of the tape upon the operation of said movable electrode by the tension of said resilient supports when released by the operation of the cam shaft, means for securing the ends of the tape on said electrodes in abutting position against the opposite sides of one of said spacer portions, said electrodes engaging the opposite sides of the other of said spacer portions under the tension of said resilient support, and manually operable means for actuating said cam shaft to cause the movement of said movable electrode by the tension of said resilient supports for engaging the two ends of the tape preparatory to the welding of the ends thereof to each other.

4. A device for welding the ends of a tape of the type used in electromagnetic recording and reproducing machines, said device comprising a stationary and a movable electrode, said electrodes having bearing surfaces for receiving the ends of the tape in a plane common to each other, spring means for supporting said movable electrode, a rotatable shaft having a pair of pinions and a pair of cams keyed thereon, means geared to said pinions and operable upon the movement of said shaft in one direction for adjustably locating said electrodes and the ends of the tape in predetermined spaced relation to each other following the movement of the movable electrode by the release of said spring means by said cams, means for securing the ends of the tape on the bearing surfaces of the adjacent ends of said electrodes following the release of said spring means by said cams, the return operation of said shaft to normal position being effective to withdraw the means geared to said pinions from between the ends of the tape and from between said electrodes for permitting the engagement of the adjacent ends of the tape in abutting relation against each other during the welding operations followed by the abutting relation of said electrodes at the completion of the welding operation.

JOHN B. LITTLE.